US012502613B1

(12) United States Patent
Cloud et al.

(10) Patent No.: US 12,502,613 B1
(45) Date of Patent: Dec. 23, 2025

(54) SYSTEMS AND METHODS FOR TACTICAL MANAGEMENT IN FANTASY SPORTS CONTESTS

(71) Applicant: SidePrize LLC, Atlanta, GA (US)

(72) Inventors: Grant Cloud, Atlanta, GA (US); Robert Landerman, Atlanta, GA (US); Dae Kang, Atlanta, GA (US); Andrew Barron, Atlanta, GA (US); Skyler Kaufman, Atlanta, GA (US); Samuel Garvis, Atlanta, GA (US); Lambert Chu, Atlanta, GA (US); Perry Sopinsky, Atlanta, GA (US)

(73) Assignee: SIDEPRIZE LLC, Atlanta, GA (US)

( * ) Notice: Subject to any disclaimer, the term of this patent is extended or adjusted under 35 U.S.C. 154(b) by 0 days.

(21) Appl. No.: 18/753,374

(22) Filed: Jun. 25, 2024

(51) Int. Cl.
*A63F 13/828* (2014.01)
*A63F 13/67* (2014.01)

(52) U.S. Cl.
CPC ............ *A63F 13/828* (2014.09); *A63F 13/67* (2014.09)

(58) Field of Classification Search
CPC ............................... A63F 13/828; A63F 13/67
See application file for complete search history.

(56) References Cited

U.S. PATENT DOCUMENTS

2015/0050988 A1* 2/2015 Nichols ............... G07F 17/3237 463/25
2017/0076553 A1 3/2017 Washington et al.
2020/0030696 A1 1/2020 Groset et al.
2021/0065516 A1* 3/2021 Warren ............... G07F 17/3272
2022/0172577 A1 6/2022 Wexler et al.

OTHER PUBLICATIONS

International Search Report and Written Opinion received in International application No. PCT/US24/36203.

* cited by examiner

*Primary Examiner* — Thomas H Henry
(74) *Attorney, Agent, or Firm* — Bradley Arant Boult Cummings LLP; Adam J. Thompson, Esq.

(57) ABSTRACT

Systems, methods, and devices for tactical management in fantasy sports contests may include modifying the effects of player performance predictions. Outcomes may be dynamically managed and adjusted based on strategic game modifiers and related strategies. Enhanced user engagement may be facilitated through a modified lineup arrangement that allows for partial successes within player lineups. A dynamic adjustment model may tailor difficulty and reward parameters dynamically based on real-time data, including player performance and external factors, ensuring a flexible fantasy sports gaming experience that adapts to the realities of sports performance and enhances participant satisfaction.

18 Claims, 6 Drawing Sheets

100

SYSTEMS AND METHODS FOR TACTICAL MANAGEMENT IN FANTASY SPORTS CONTESTS

TECHNICAL FIELD

The present disclosure generally relates to systems and methods for tactical management in fantasy sports contests, particularly managing and adjusting outcomes by modifying the effects of player performance predictions.

BACKGROUND

Fantasy sports have increasingly become a staple in the landscape of online gaming, captivating millions of participants who engage in crafting virtual teams that mirror real-life sports leagues. In these games, players may assume the role of team managers, assembling their teams by selecting real athletes from various sports such as football, basketball, and baseball. The success of a participant's fantasy team hinges on the actual performance of the chosen athletes in their respective sports events, which translates into points within the fantasy game. This correlation between real-world outcomes and virtual team performance has significantly enhanced the appeal of fantasy sports, leading to heightened participation and engagement across diverse demographics.

However, despite the growth and popularity of fantasy sports, current platforms offer limited engagement mechanisms, especially in scenarios involving tactical management of player selections. Traditional fantasy sports contests typically allow users to select multiple players but provide minimal support in cases where selected players are unable to participate due to injuries or other reasons. For example, although conventional fantasy sports platforms may offer insurance or similar features for a single entry, conventional fantasy sports platforms cannot extend coverage to multiple selections within the same lineup. This gap in the gameplay experience can lead to frustration and reduced engagement, particularly when a user's strategic selections are compromised by unforeseen player unavailability.

Addressing this deficiency, there is an unresolved need for systems and methods that enhance user engagement through more dynamic gaming experiences in fantasy sports. The traditional model's inability to provide multi-pick insurance in scenarios where several players may be sidelined simultaneously represents a significant limitation. Introducing innovative features that allow for the insurance of multiple picks within a player's lineup could revolutionize user interaction with fantasy sports platforms. By enabling more sophisticated tactical management strategies, such fantasy sports platforms would not only retain current users but also attract new ones, enriching the overall fantasy sports experience and maintaining sustained interest and participation.

Moreover, conventional fantasy sports platforms lack an ability to manage tactical opportunities associated with the application of game modifiers to player selections. These conventional platforms traditionally focus on static gameplay models where users select players based on expected performance without the ability to adjust the difficulty dynamically in response to changing game conditions or player availability. Specifically, while some basic forms of insurance or difficulty mitigation may be available, such as coverage for non-participation due to player injury, these platforms do not typically support application of strategic modifiers or tactical management options when strategic modifiers are applied.

The strategic modifiers, which may adjust difficulty and potential rewards associated with player performance predictions, may significantly alter the gameplay dynamics. However, conventional platforms fail to provide these modifiers or fail to extend tactical management options to selections involving such modifiers, thereby failing to provide protection against the additional challenges taken on when users opt to take advantage of these strategic tools. This omission can be particularly disadvantageous in scenarios where multiple players within a user's lineup are subject to enhanced difficulty levels due to the application of such modifiers. The inability to ensure these adjusted difficulty levels may result in heightened financial exposure and potential dissatisfaction, especially when outcomes do not align with predictions due to unforeseeable factors like player injuries or unexpected poor performances.

Addressing this gap, there is a pressing need for enhanced systems and methods that allow for comprehensive tactical strategies that include insurance options covering the application of game modifiers. Such innovations may enable users to engage more confidently with the platform, secure in the knowledge that their strategic decisions and enhanced gameplay experiences are supported by robust insurance mechanisms, thus driving sustained engagement and attracting a broader user base.

This background information is provided to reveal information believed by the applicant to be of possible relevance. No admission is necessarily intended, nor should be construed, that any of the preceding information constitutes prior art.

SUMMARY

Briefly described, and in various embodiments, the present disclosure generally relates to interactive gaming and digital entertainment, specifically within the context of fantasy sports.

Moreover, the present disclosure is particularly relevant to systems and methods for managing and adjusting outcomes by modifying the effects of player performance predictions through strategic game modifiers and comprehensive tactical strategies.

According to some aspects, a computing infrastructure (e.g., a computing environment, a client device, and various external resources) is provided for a modified lineup arrangement in fantasy sports contest. The disclosed modified lineup arrangement may cater to seasoned players seeking complex tactical strategies while also accommodating to beginners looking for a more forgiving entry point into fantasy sports. By allowing for partial successes within a selected lineup, aspects of the disclosure may mitigate the all-or-nothing approach typical of traditional fantasy sports competitions, thus maintaining user engagement and satisfaction even in less-than-ideal outcome scenarios. Moreover, a disclosed dynamic adjustment model further addresses the limitations of conventional fantasy sports by enabling a flexible tactically versatile gaming experience that adapts to the realities of sports and player performances. The disclosed advancements benefit participants in fantasy sports contests by potentially increasing user retention and satisfaction, as users are more likely to continue participating when the game model accommodates varying levels of success and provides opportunities for recovery and gain even when not all selections perform as expected.

According to some aspects, a computing infrastructure (e.g., a computing environment, a client device, and various external resources) is provided for a modified lineup arrangement in fantasy sports contests. This infrastructure supports the application of game modifiers such as demon or goblin modifiers, which adjust the difficulty and reward parameters of player selections. The disclosed system includes mechanisms that mitigate the difficulty of winning fantasy sports contests associated with these modified line-ups, providing a safety net against the increased difficulty levels inherent in utilizing such modifiers. This innovation caters to seasoned players seeking complex strategies and beginners looking for a more accessible entry point into fantasy sports contests.

By allowing for partial successes within a selected lineup and providing difficulty mitigation for selections involving game modifiers, aspects of the disclosure alleviate the all-or-nothing approach typical of traditional fantasy sports contests. This maintains user engagement and satisfaction even in less-than-ideal outcome scenarios. Furthermore, a dynamic adjustment model incorporated in the system addresses the limitations of conventional fantasy sports contests by enabling a flexible, tactically versatile gaming experience that adapts to the realities of sports and player performances. These disclosed advancements benefit participants in fantasy sports contests by potentially increasing user retention and satisfaction, as users are more likely to continue participating when the game model accommodates varying levels of success and provides opportunities for recovery and gain, even when not all selections perform as expected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

Figure 1:
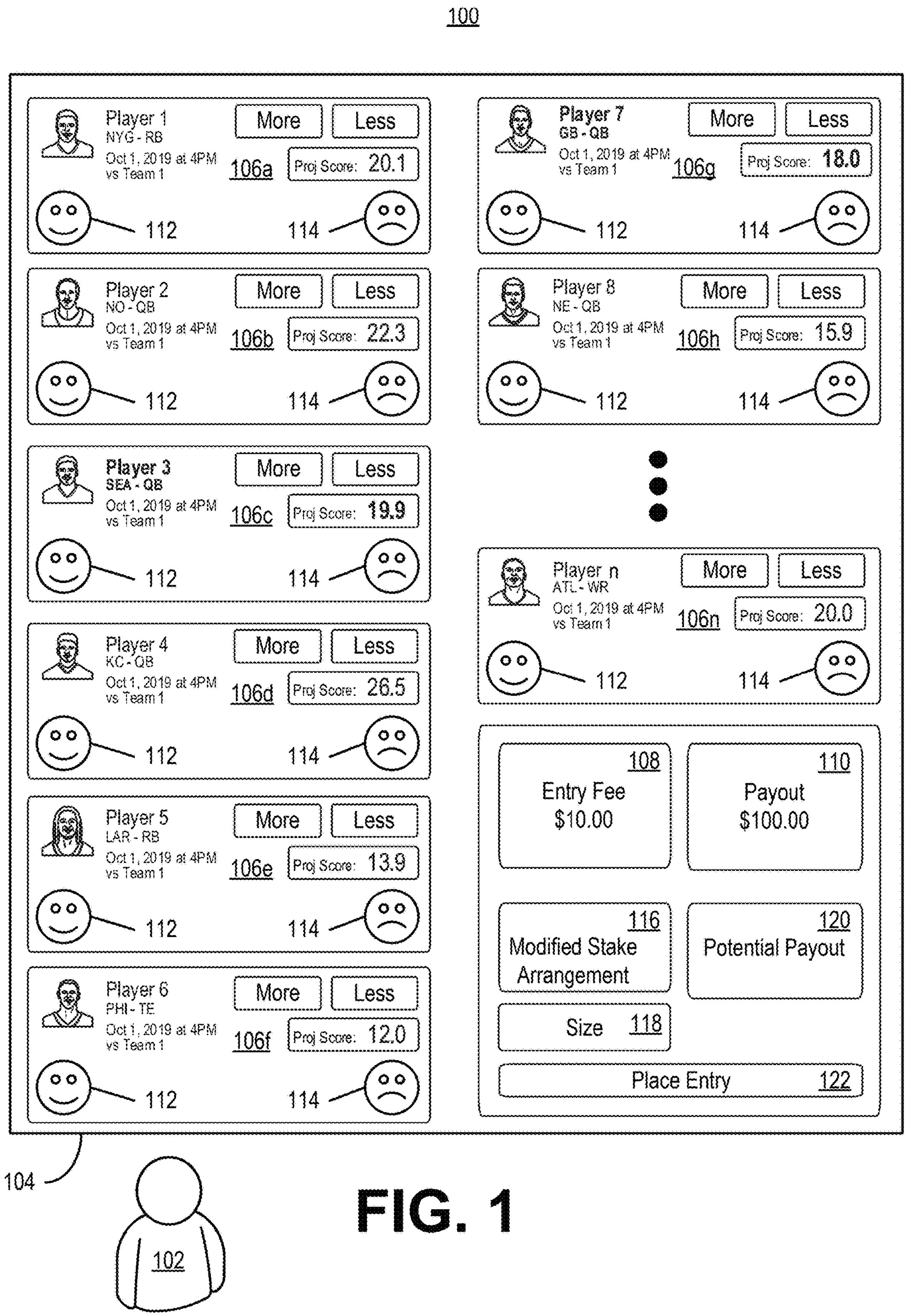
FIG. 1 illustrates an exemplary player selection interface.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

User. A consumer interacting with a particular product (e.g., a fantasy sports contest).

Operator. An entity representing a contest (e.g., a fantasy sports contest) operator or organizer.

Lineup. The collection of squares submitted by a user into the operator's contest in an attempt to win the contest's prize.

Square. A single component of a lineup, based on the performance of an individual player or a combination of players.

Offer. A submission of a lineup made to the contest operator.

Correlation. The degree to which two or more quantities are quantitatively related to one another.

Correlation Value. A measurement of correlation which may be a number between 1 and −1. A number close to 1 may mean two factors are positively correlated (e.g., they may rise or fall together and at a similar magnitude), a number close to −1 may mean the two factors are oppositely correlated (e.g., they may rise or fall oppositely and at a similar magnitude), and a number closer to 0 may mean that the two factors may be mostly random to each other, therefore not significantly correlated.

Related Contingencies. Any lineup comprising squares within a correlation value that is not equal to zero (e.g., a related contingency may be any lineup that comprises square(s) associated with any sort of dependent event).

Payout. An amount of value, relative to the lineup and associated entry fee, which will be rewarded upon a win.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Referring now to the figures, for the purposes of example and explanation of processes and components of the disclosed systems and processes, reference is made to FIG. 1, which illustrates an environment 100 for a fantasy sports contest. As shown in FIG. 1, a player selection interface 104 provides an interface for user 102 to engage deeply in strategic aspects of fantasy sports by selecting a number of players (e.g., players **106*a*-106*n*), cumulatively referred to as players 106, for their participation in contests. The player selection interface 104**, as illustrated, represents just one approach or aspect of the present concept, adaptable according to various embodiments of the concept.

Users 102 may interact with the player selection interface 104 through various client devices (e.g., client device 350 illustrated in FIG. 3), broadening accessibility and ensuring that user 102 may engage from any location. One or more selections (e.g., a lineup selection) by user 102 may set forth one or more predictions, introducing a strategic layer to the selection process. Selectable outcomes may be presented by the player selection interface, challenging users to engage deeply with the sports they love and test their analytical skills.

The lineup selection by user 102 within the player selection interface 104 may introduce additional strategic depth to gameplay. User 102 may define the size of their lineup (e.g., comprising one or more players 106), choosing from a range of lineups involving two or more of the selected players 106 and their associated events. An element of strategic management may be introduced as user 102 weighs the likelihood of correctly predicting outcomes against the potential for higher rewards. Upon finalizing their lineup, user 102 may be prompted to choose an entry fee 108, with the player selection interface 104 displaying the potential payout 110 associated with their selections.

To enhance user engagement, the player selection interface 104 may include one or more increased difficulty modifiers 112 (e.g., "Demons") and/or decreased difficulty modifiers 114 (e.g., "Goblins"). Selection of these modifiers may dynamically adjust the potential payout 110, allowing user 102 to customize their experience based on their preferred difficulty level and strategic preferences. After selecting their lineup and any difficulty modifiers, user 102 may receive immediate feedback on how these choices influence the financial aspects of their participation, enhancing their decision-making process.

For instance, a confident user 102 may select one or more increased difficulty modifiers 112 to capitalize on higher difficulty levels with a potential for larger rewards. Conversely, a more cautious user 102 may choose one or more decreased difficulty modifiers 114 to minimize difficulty, accepting smaller rewards for an easier difficulty level of winning. This feedback mechanism may ensure that user 102 understands the financial implications of their difficulty modifiers, enhancing user engagement by allowing a customized difficulty to reward balance and deepening the strategic elements of the platform, making it more appealing.

Additionally, the player selection interface 104 may incorporate a modified lineup arrangement 116. The modified lineup arrangement 116 may offer a more flexible system of participation that goes beyond binary outcomes, allowing for partial successes within the lineup selected by the user 102. Moreover, the modified lineup arrangement 116 may reduce the difficulty associated with non-performance, ensuring that even if some of the selected players 106 underperform, user 102 still has opportunities for partial rewards.

Once the lineup is determined, user 102 may make selections associated with the modified lineup arrangement 116, choosing a size 118 of their lineup and the associated potential payout 120. The size 118 may indicate the number of players covered by the arrangement in events of non-performance, offering user 102 a customizable level of difficulty and tactical management. This customization may represent a significant advancement in fantasy sports technology, providing a flexible, tactically versatile experience that adapts to the realities of sports and player performances.

The modified lineup arrangement 116 may also be associated with a dynamic payout model, adding layers of strategy to the gaming experience. User 102 may adjust the size 118 of their lineup and the associated potential payout 120, diversifying their participation across multiple sports and events. The dynamic payout model may facilitate a tiered payout structure, where different levels of success may result in varying payout levels, enhancing engagement by allowing strategic depth and increasing the potential for higher rewards based on the cumulative performance of selected players.

As a specific example of user interaction with the player selection interface 104, user 102 may plan for an upcoming fantasy football weekend. This example may illustrate strategic depth provided by the player selection interface 104, including contribution of difficulty modifiers (e.g., increased difficulty modifiers 112 and/or decreased difficulty modifiers 114) and the modified lineup arrangement 116 to a nuanced gameplay experience.

User 102 may log into their fantasy sports account using a tablet and may access the player selection interface 104 from the comfort of their living room. The player selection interface 104 may display an array of NFL players (e.g., players 106) available for the coming weekend's games. After reviewing recent player performances and expert analysis, user 102 may decide to select a lineup comprising a quarterback known for his explosive plays, a dependable wide receiver, and a running back with a history of consistent scoring.

Upon selecting the players 106, user 102 may proceed to apply tactical management strategies to their lineup. First, user 102 may apply an increased difficulty modifier 112 ("Demon") to the quarterback, anticipating a high-scoring game against a weaker defense. This choice may increase the potential payout 110, reflecting the higher difficulty level taken on by user 102. Concurrently, user 102 may opt for a decreased difficulty modifier 114 ("Goblin") for the running back, who has been slightly inconsistent lately, thus reducing the difficulty of winning and potential payout associated with this player, aiming for more guaranteed but modest rewards.

Next, the user 102 may navigate to selection of a modified lineup arrangement 116 section. Understanding the potential for non-performance due to injuries or off days, user 102 way selects a size 118 for their lineup, which may cover two of the three players-excluding the quarterback, whom they feel confident about. This selection aims to mitigate the impact of potential underperformance from the wide receiver or running back.

The player selection interface 104 may dynamically adjust the potential payout 120 based on the selections. The player selection interface 104 may present a tiered payout structure where if all three players perform well, the payout is maximized, particularly boosted by the "Demon" modifier on the quarterback. If only the quarterback excels, the payout is substantial but less than the maximum due to the conservative "Goblin" application on the running back. The interface shows these potential scenarios clearly, allowing user 102 to understand the financial implications of their strategic choices.

After reviewing the details, user 102 may confirm the entry fee 108 and finalize their participation (e.g., by selecting "Place Entry" 122). The player selection interface 104 may provide a summary of the choices, including the potential payout 120, which may reflect the modified difficulty levels due to the application of both "Demon" and "Goblin" modifiers, as well as the difficulty protection provided by the modified lineup arrangement 116 for two out of three players.

This interaction of the user 102 may exemplify how the player selection interface 104 may facilitate a deep strategic engagement in fantasy sports, allowing user 102 to not only choose players but also manage strategies and tactics associated with their performance actively. This scenario may illustrate how the platform's features may cater to a wide array of strategies of fantasy sports enthusiasts, enhancing user engagement and satisfaction by aligning the game mechanics with their personal difficulty tolerance and strategic preferences.

This enhanced interaction within the player selection interface 104 may allow user 102 to fully customize their fantasy sports experience, blending their knowledge of sports with strategic financial decisions. Through innovative features such as difficulty modifiers 112 and 114 and the modified lineup arrangement 116, the platform may cater to the diverse needs and preferences of users, ensuring a fulfilling and enjoyable gaming experience for all.

Figure 2:
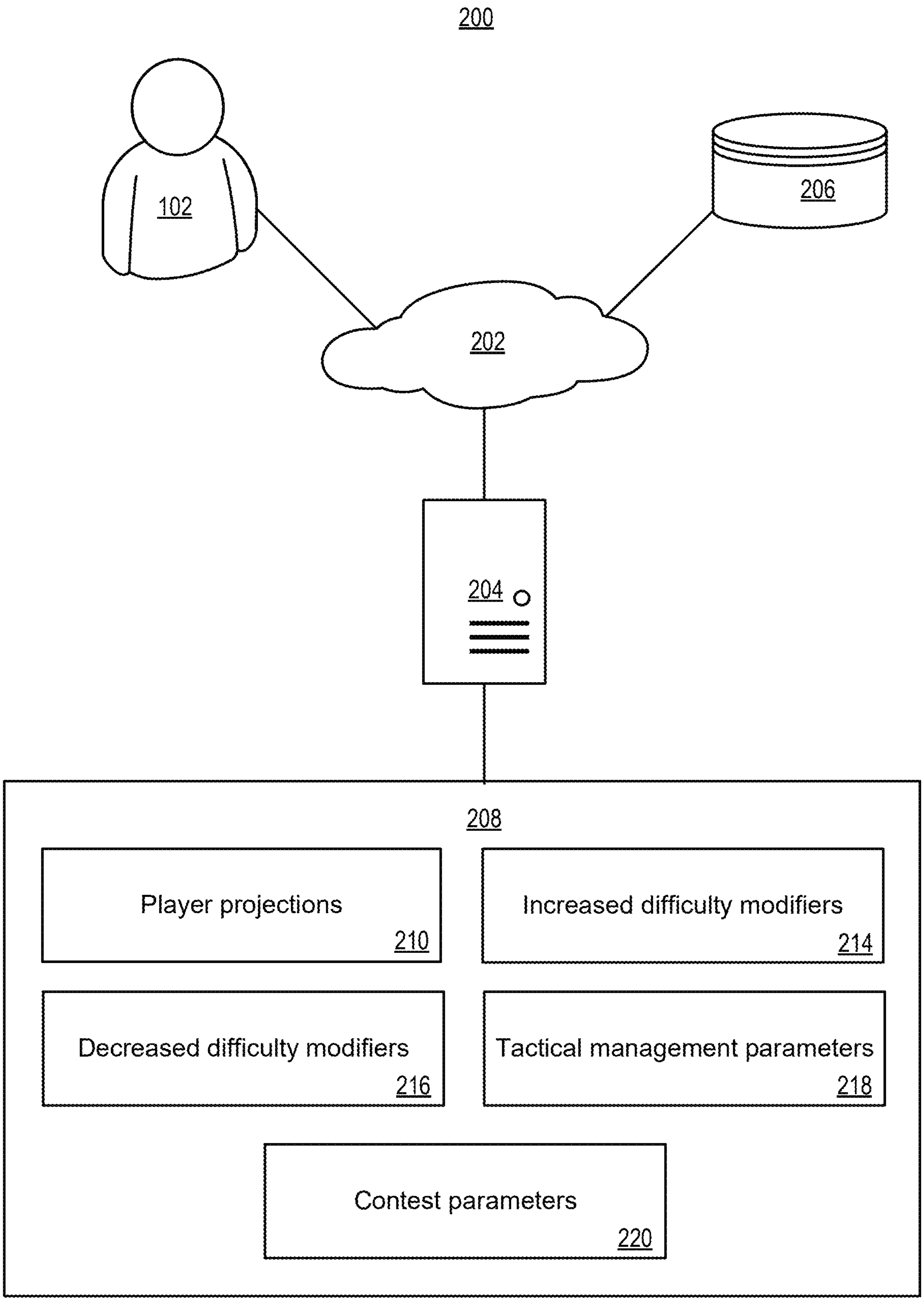
FIG. 2 illustrates an exemplary networked environment.

As shown in FIG. 2, an environment 200 for a fantasy sports contest may facilitate interactive fantasy gaming for a user 102. The environment 200 may include a network 202, a server 204, and a database 206. The individual elements of the environment 200, working in concert, may deliver a seamless and engaging fantasy sports experience, leveraging advanced algorithms and data analytics to provide a modified arrangement to a selected lineup, impacting gameplay by enabling a flexible, tactically versatile gaming environment, reflecting real-world sports dynamics.

The network 202 may provide a versatile and dynamic conduit that enables communication and data exchange across the environment 200. The network 202 may encompass a wide range of connection types, including wired, wireless, and cloud-based technologies, ensuring that user 102 may access the fantasy sports contest platform from virtually anywhere. This connectivity may support real-time interactions and updates, allowing user 102 to make informed decisions based on the latest available information, ranging from player performance data to changes in contest dynamics.

According to some aspects, the server 204 may act as a central processing unit within the environment 200, orchestrating the myriad operations necessary to run the fantasy contests efficiently. The server 204 may handle tasks ranging from user authentication and data processing to the execution of complex algorithms utilized by a difficulty modifier module 208 including selections and strategic decisions about lineups. Moreover, the server 204 may manage flow of information between user 102 and the system, ensuring that user selections, lineups, and other inputs are accurately recorded and reflected in the contest outcomes.

As shown in FIG. 2, the database 206 may store a vast array of information associated with the operation of the fantasy sports contests. For example, the database 206 may comprise one or more of user profiles, player statistics, contest results, contest parameters, and difficulty management data. The difficulty management data may support the selection of modified lineup arrangements and may include models and algorithms for difficulty evaluation. By maintaining a comprehensive and up-to-date repository of information, the database 206 may enable the server 204 to perform in-depth analyses and make informed decisions that enhance the gaming experience.

The database 206 may comprise a comprehensive collection of difficulty and tactical management data for facilitating the operation of fantasy sports contests with user selection protection. This difficulty management data may encompass various elements including predictive analytics models, which may process historical and current performance data to forecast outcomes and determine potential strategies associated with player selections. The predictive analytic models may enable dynamic offerings of difficulty mitigation strategies tailored to the changing conditions of players and games. Moreover, the difficulty management data may include a recording of user preferences and historical choices. The user-centric data may facilitate customization of tactical strategies based on individual difficulty and strategic appetites and previous decision patterns, enhancing the personalized gaming experience.

Furthermore, the database may include a repository of difficulty modifier definitions and parameters. These definitions may facilitate the application of strategic game modifiers that adjust difficulty levels associated with various player performance predictions. For example, difficulty modifiers may include options to mitigate the impact of a key player's unexpected non-participation due to injury, thereby safeguarding the user's lineup in the broader fantasy contest context. According to some aspects, the difficulty and strategic management data may include algorithmic tools associated with calculating and adjusting the lineups dynamically in response to real-time events, such as sudden player unavailability or unexpected game developments. This dynamic adjustment capability may ensure that difficulty mitigation strategies are responsive and reflective of the latest available information.

An assortment of other data points housed within database 206 may include market trends, sports event schedules, real-time sports news, and injury reports, amongst others. This data may be utilized by the adaptive algorithms employed by server 204. Real-time sports news and injury reports, for example, may have immediate impacts on player statistics and contest outcomes, necessitating swift adjustments to difficulty modifiers and difficulty and tactical management parameters to maintain an equitable contest environment. Market trends, on the other hand, may provide insights into user behavior and preferences, influencing the strategic deployment of difficulty modifiers and difficulty and tactical management strategies to enhance user engagement and platform loyalty.

A difficulty modifier module 208 may operate within or alongside the server 204, interfacing with the database 206 to access and process essential data that may influence difficulty management decisions in real time. Moreover, the difficulty modifier module 208 may dynamically manage and adjust difficulty levels associated with player selections.

The difficulty modifier module 208 may utilize player projections 210 to enhance decision-making. The difficulty modifier module 208 may determine, store, and/or access statistical forecasts from the database 206, which may predict player performances based on historical data and current form. By determining and/or analyzing these projections, the difficulty modifier module 208 may suggest specific difficulty modifiers that align with anticipated player outputs, such as increasing lineup frequencies on a consistently high-performing player. Therefore, the difficulty modifier module 208 may ensure that users may make informed decisions about their player selections to optimize potential rewards.

Increased difficulty modifiers 214 may be utilized by the difficulty modifier module 208 to provide users with options to amplify their potential winnings. When a user selects an increased difficulty modifier, the difficulty modifier module 208 may recalculate potential payouts and associated difficulty levels, incentivizing a higher difficulty level in connection with higher rewards. An example of this is doubling the points for a player expected to excel in a particular match, thereby increasing both the potential payout and the difficulty of the player attaining his or her projection. As a result, the difficulty modifier module 208 may promote strategic gameplay by allowing users to capitalize on their sports insights and predictions.

The difficulty modifier module 208 may apply decreased difficulty modifiers 216 to reduce potential losses in uncertain scenarios. The decreased difficulty modifiers 216 may be applied by a user when dealing with players who might underperform due to factors such as injuries or tough matchups. By applying a decreased difficulty modifier 216, the difficulty modifier module 208 may lower the scoring potential and hence increase the likelihood of the player attaining his or her projection, which may be particularly useful for safeguarding the user's position in the contest. The difficulty modifier module 208 may provide a safety net, enabling users to maintain steadier, albeit potentially lower, returns.

Tactical management parameters 218 may be determined by the difficulty modifier module 208 to ensure that difficulty adjustments are made within predefined limits. The tactical management parameters 218 may set the boundaries for amounts that the difficulty level may be increased or decreased, based on the volatility and unpredictability of player performances. The difficulty modifier module 208 may use these parameters apply the difficulty modifiers, ensuring that the gameplay remains balanced and within the competitive spirit of the contest. Difficulty modifier module 208 may maintain the integrity and fairness of the fantasy sports contest by adhering to established tactical management guidelines.

Contest parameters 220 may be applied by the difficulty modifier module 208 to align with specific contest rules. The contest parameters 220 may include rules, scoring systems, and configurations of each contest, which may be considered when adjusting difficulty levels and tactical decisions. For instance, in a contest emphasizing defensive player performances, the difficulty modifier module 208 may adjust the difficulty modifiers to focus more on these players. Therefore, the difficulty modifier module 208 may ensure compliance and relevance by tailoring difficulty and tactical management strategies to the specific dynamics of each contest.

The difficulty modifier module 208 may respond in real-time to updates and changes in player and contest conditions. The difficulty modifier module 208 may adapt strategies based on last-minute player injuries or other unforeseen events that could impact game outcomes. For example, if a key player is unexpectedly benched before a game, the difficulty modifier module 208 may immediately adjust the difficulty modifiers to reflect this change, thus protecting the user's interests. Consequently, the difficulty modifier module 208 may enhance the adaptability and responsiveness of the gaming experience. Moreover, the difficulty modifier module 208 may provide clear feedback on the implications of each difficulty modifier choice. Through an interactive interface, users may see how different modifiers affect their potential outcomes and adjust their selections accordingly. This transparency may aid users to understand the trade-offs involved in their decisions, fostering a more engaged and informed player base.

Furthermore, the difficulty modifier module 208 may enable users to adjust their difficulty levels according to personal preference and strategic considerations, catering to a wide range of players from conservative to aggressive with respect to difficulty level. This customization capability may ensure that the fantasy sports platform may appeal to a diverse user base, enhancing overall satisfaction and retention. As a result, the difficulty modifier module 208 may differentiate the fantasy sports platform in a competitive market.

The difficulty modifier module 208 may maintain the competitive and strategic integrity of fantasy sports contests. By integrating various data inputs and providing dynamic adjustment capabilities, the difficulty modifier module 208 may support a fair and engaging gaming environment. Moreover, the difficulty modifier module 208 may manage player tactics and help them make informed decisions based on comprehensive data analysis, ensuring that users remain committed and active participants in the fantasy sports community. The difficulty modifier module 208 may support the operational needs of the platform and enhance user satisfaction and loyalty.

The difficulty modifier module 208 may address several technical problems inherent in the management of fantasy sports contests, particularly in the realm of dynamic tactical management and real-time adjustment of game strategies. For example, unlike conventional fantasy sports platforms, the difficulty modifier module 208 may accurately adjust potential payouts based on real-time changes in player performance projections and game conditions. For example, in traditional fantasy sports platforms, the static nature of difficulty assessment mechanisms fails to accommodate sudden changes in player availability or performance predictions. For instance, if a key player is injured just before a game, users who have selected that player would be disproportionately disadvantaged, potentially facing significant and unforeseen losses. This static approach leads to a lack of engagement and dissatisfaction among users, who may feel their strategies are compromised by factors beyond their control.

The difficulty modifier module 208 may comprise a dynamic difficulty adjustment mechanism that recalculates difficulty levels and potential rewards in real-time based on live data inputs. By integrating with the server 204 and continuously receiving updated data from the database 206, including player projections and current contest conditions, the difficulty modifier module 208 may apply increased or decreased difficulty modifiers dynamically. For example, the difficulty modifier module 208 may automatically adjust the difficulty modifiers for a user's lineup when a player's projected performance changes due to external factors such as weather conditions, injuries, or other game-day decisions. If a player is unexpectedly sidelined, the difficulty modifier module 208 may apply a decreased difficulty modifier to reduce the potential negative impact on the user's lineup. If a backup player is expected to perform well in place of a starter, the module can suggest applying an increased difficulty modifier to capitalize on this unforeseen opportunity.

This dynamic adjustment capability may ensure that the fantasy sports platform remains responsive and flexible, enhancing user satisfaction by providing a more equitable and controlled gaming environment. Users may benefit from a system that supports informed decision-making and strategy adjustments in real time, thereby reducing frustration and increasing engagement. Additionally, the difficulty modifier module 208 may maintain the integrity and competitive balance of the fantasy sports contests, as all participants are subject to the same adaptive and responsive difficulty and tactical management system.

Figure 3:
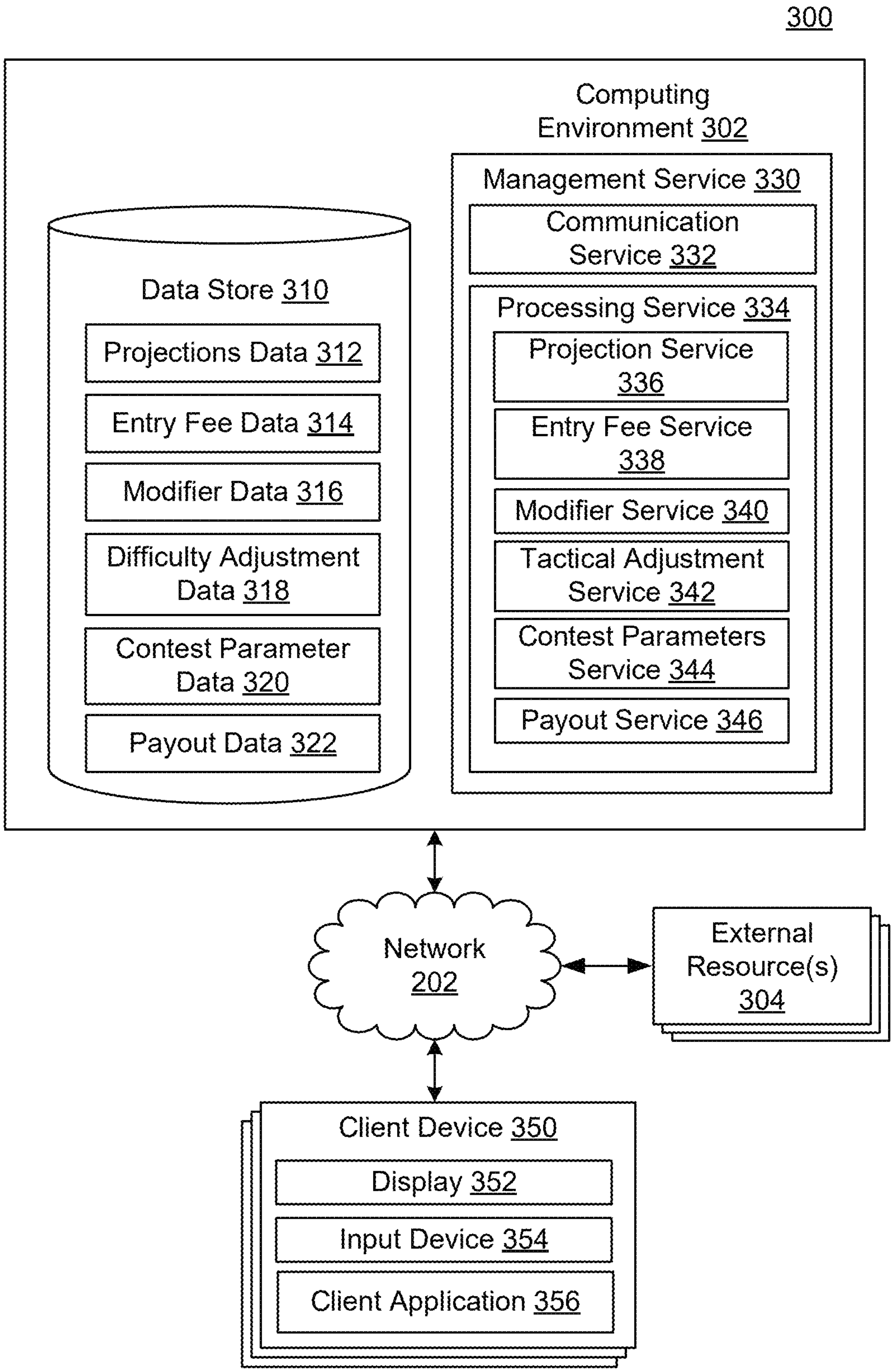
FIG. 3 illustrates an exemplary networked environment.

As shown in FIG. 3, the networked environment 300 may facilitate fantasy sports contests, leveraging advanced algorithms and data analytics to apply one or more increased difficulty modifiers 112 (e.g., "Demons") and/or decreased difficulty modifiers 114 (e.g., "Goblins") to dynamically adjust contest parameters 220. This networked environment 300 may include a computing environment 302, various external resources 304, and client device 350, one or more of which may be interlinked via a network 202. One or more of the client devices 350 may comprise a display 352, input device 354, and/or a client application 356. Network 202, including one or more of the Internet, LANs, WANs, and wireless connections, may provide communication within the networked environment 300, including real-time data exchanges, updates, and interactions.

The computing environment 302 may operate within a single device or may span across multiple devices or servers. These devices, potentially distributed across different locations, may work collectively to process, administer, and manage the functionalities associated with the fantasy contests. Moreover, the computing environment 302 may adapt to the computational demands, making it an elastic resource capable of scaling according to the operational needs of the fantasy sports platform. It handles crucial tasks such as lineup processing, outcome determinations, payouts distributions, and analytical data management, positioning it as the central node of the networked environment.

The data store 310 may serve as a repository for an array of data types associated with the fantasy contest's operation, including projections data 312, entry fee data 314, modifier data 316, difficulty adjustment data 318, contest parameter data 320, payout data 322, and various other datasets that may contribute to the fantasy gaming experience. Each dataset may be used to facilitate the dynamic adjustment of entry fees and potential payouts based on the user's selections, including the application of difficulty modifiers. The projections data, for example, may encompass detailed information about athletes that users can leverage to make informed decisions when forming their fantasy lineups. This includes performance statistics, team affiliations, and event-specific data that are essential for the analytical algorithms to evaluate and apply the appropriate difficulty level and rewards.

Projections data 312 may include detailed information about the athletes around which the fantasy sports contests revolve. Projections data 312 may include performance statistics, team affiliations, and event-specific data that user 102 may leverage to make informed decisions when forming their fantasy lineups. By pulling in this data from external resources 304, the computing environment 302 may ensure that user 102 has access to current and comprehensive player information.

According to some aspects, projections data 312 may include identification and contextual information about athletes, including but not limited to, the player's name, the team they represent, the sport they participate in, and their specific role or position within the team. This athlete information may be associated with allowing user 102 to recognize and select players based on team compositions, individual preferences, or strategic considerations aimed at optimizing their fantasy team's performance. Projections data 312 may further integrate a broad spectrum of performance statistics for each athlete. These statistics may provide quantitative measures of a player's contributions to their team's efforts, including scoring, assists, defensive achievements, and other relevant performance metrics. Detailed statistical information may enhance the fantasy sports experience by influencing the points accrued by users' fantasy teams based on real-world athlete performances.

To further enrich the decision-making process, projections data 312 may include additional contextual variables that may influence an athlete's performance. These contextual variables may include data on a player's teammates, the leagues and competitions they are involved in, and upcoming sporting events they are scheduled to participate in. This additional layer of information may offer user 102 insights into the dynamics of team synergy, the competitive landscape of various leagues, and the strategic importance of specific events, all of which may inform more nuanced player selection strategies. Moreover, projections data 312 may account for environmental factors such as the geographical location of sporting events and prevailing weather conditions, recognizing their potential impact on game outcomes and individual performances. For example, athletes may exhibit varying performance levels under different weather conditions or at specific venues, influencing the strategic selection of players for fantasy teams.

Historical performance data and analytics included in projections data 312 may afford user 102 a deeper exploration into an athlete's performance trends and potential. Historical data may highlight patterns and consistency in performances over time, while analytics may offer predictive insights, equipping the user 102 with advanced tools to gauge future performance probabilities. Projection data 312 may be dynamically maintained, with continuous updates from a variety of external resources 304, such as sports statistics databases, event data feeds, and gaming platforms, ensuring that the platform delivers the most current and comprehensive player information possible, enabling users to base their fantasy team selections on the latest available data.

Projection data 312 and entry fee data 314 further refine the contest dynamics by encapsulating the predictive aspects of the contests and the financial commitments made by users. These data points influence the formation of lineups and the structuring of contest payouts, making them fundamental to the strategic depth of the fantasy contests.

Projections data 312 may encompass selections made by user 102 concerning player performances within the framework of fantasy sports contests. This dataset may include a collection of users' predictions on various aspects of athletes' performances in upcoming games, including, but not limited to, points scored, yards gained, goals made, assists, rebounds, and other sport-specific performance metrics. These projections reflect the users' expectations and strategic choices, based on their analysis or intuition about future sports events.

The projections data 312 may be associated with calculated potential outcomes, and determine payouts based on the accuracy of these user-generated projections. Each entry in the projections data 312 may be linked to increased difficulty modifiers (e.g., "Demons") and decreased difficulty modifiers (e.g., "Goblins"), serving as an input for algorithms that assess associated modifications to difficulty levels and payouts, contributing to the overall gaming strategy. By aggregating and analyzing these user selections, the system may offer insights into popular trends, potential sleeper picks, and widely anticipated outcomes, enriching the community's collective intelligence.

Projections data 312 may be continuously updated with new user selections and may be maintained to ensure data integrity and relevance. Initial projections may be captured, as well as accommodating changes users might make up to a cut-off time before the actual sporting events, reflecting late-breaking news or last-minute strategic adjustments. As such, projections data 312 may evolve with the sports calendar and the participatory dynamics of the fantasy sports contests, serving as a component of the platform's engagement mechanics and its appeal to users seeking a deeply interactive and competitive fantasy sports experience.

Entry fee data 314 may include data associated with the selection of entry fees by user 102 for participation in fantasy sports contests. The entry fee data 314 may represent the financial engagement of user 102 with the platform, recording the entry fees the user 102 is willing to commit to compete in various fantasy contests. Entry fee data 314 not only captures the amount selected by each participant but also provides data for the economic model of the fantasy sports platform. By aggregating these financial commitments, the system may balance increased difficulty modifiers (e.g., "Demons"), decreased difficulty modifiers (e.g., "Goblins"), and difficulty adjustments with associated entry fees and payouts, tailoring contests to meet diverse user preferences and difficulty level appetites.

Moreover, entry fee data 314 may serve an input for several operational and analytical processes within the system. The entry fee date may be used in the calculation of contest payouts, ensuring that winnings are distributed based on predefined criteria reflective of the contest's parameters and participant performance. Furthermore, entry fee data 314 may reflect increased difficulty modifiers (e.g., "Demons"), decreased difficulty modifiers (e.g., "Goblins"), and difficulty adjustments.

Modifier data 316, stored within the data store 310 of the networked environment 300, may allow users to dynamically adjust the difficulty levels associated with their contest entries. The modifier data 316 may comprise detailed information on increased difficulty modifiers ("Demons") and decreased difficulty modifiers ("Goblins"), along with the rules and parameters that govern how these modifiers affect the potential payout. The inclusion of difficulty modifiers may introduce a strategic element to the contests, enabling users to tailor their gaming experience according to their difficulty level appetite and strategic outlook. The storage of modifier data 316 may be comprehensive, capturing not only the classification and effect of each modifier but also the contextual rules and probabilities that dictate the application of these modifiers to the users' selections.

The architecture of the data store 310 may facilitate the organization and retrieval of modifier data 316, ensuring that the application of difficulty modifiers to user entries is both accurate and reflective of the current contest dynamics. The modifier data 316 may include algorithms and formulas used to calculate adjusted probabilities of outcomes based on the application of difficulty modifiers, thereby influencing the recalculated potential payouts. The impact of each difficulty modifier may be immediately reflected in the contest setup. As such, the data store 310 may accommodate rapid updates and modifications to the modifier data, allowing for the introduction of new modifiers or the adjustment of existing ones based on gameplay analytics and user feedback.

The data store 310 may comprise difficulty adjustment data 318. The difficulty adjustment data 318 may be associated with offering financial protections to participants of the fantasy sports contest, e.g., shielding participants from the financial effects of nonperformance by their selected players. The difficulty adjustment data 318 may be structured within the data store 310 and may provide resources for offering and/or activating protections. These protections may compensate participants if players unexpectedly do not participate due to reasons such as injury or last-minute benching, thus maintaining fairness and user engagement across the platform. Moreover, difficulty adjustment data 318 may comprise one or more conditions, such as player injuries confirmed through reliable sports news feeds or official team announcements. Real-time data may be assessed to determine the activation of this protective measure, ensuring that the information is accurate and current.

For example, when difficulty adjustment data 318 identifies that a player included in a participant's lineup will not perform, mechanisms such as score adjustments or the provision of a backup player from the participant's bench may be triggered. By managing player nonperformance, the data store 310 may enhance the platform's functionality and user experience, driving engagement and trust in the system's fairness and responsiveness to changes in player availability.

The data store 310 may comprise contest parameter data 320, e.g., for the dynamic adjustment of contest dynamics based on user interactions, tactical preferences, and strategic decisions. The contest parameter data 320 data may encompass a wide array of information, including but not limited to, detailed algorithms for difficulty assessment, parameters for adjusting contest dynamics, and other elements that may contribute to the real-time recalibration of contests in response to user inputs such as player projections, entry fees, difficulty modifiers, and strategic adjustments.

For example, contest parameter data 320 may include algorithms that specifically address the recalibration of lineup success or payout ratios in response to the cumulative application of increased difficulty modifiers ("Demons"), decreased difficulty modifiers ("Goblins"), or difficulty adjustments. One such algorithm may be a dynamic award adjustment algorithm, which may recalculate the likelihood of success of specific outcomes based on the overall balance of lineups placed across different contest outcomes, incorporating the tactical profile alterations induced by user-selected difficulty modifiers and/or user-selected difficulty adjustments. If a significant volume of users opts for increased difficulty modifiers on a high-payout outcome, the algorithm may adjust the payout ratio to reflect the increased exposure assumed by the platform, thus ensuring a balanced distribution. Likewise, if a significant volume of users selects difficulty adjustments associated with a particular outcome, the algorithm may adjust the potential payouts to reflect the increased exposure by the platform.

Another component of the contest parameter data 320 includes adjustment parameters that dictate how user-selected entry fees and associated difficulty management selections influence contest dynamics. For example, a scaling algorithm may adjust payout ratios based on an aggregate amount of entry fees committed to particular outcomes, ensuring that payouts remain proportionate to the level of financial engagement by the users. This scaling algorithm also considers the impact of tactical management selections, such as insurance-like protections against player nonperformance, adjusting the payout ratios to reflect both the entry fees and the strategic profiles associated with these selections. Higher entry fees coupled with tactical management selections indicative of a higher difficulty appetite may lead to proportionately higher payouts.

Additionally, the contest parameter data 320 includes parameters for adjusting the performance thresholds in sports contests, which are directly influenced by the aggregate application of difficulty modifiers associated with tactical management selections. An example includes a threshold adjustment algorithm that modifies performance benchmarks, such as points scored by a player in a game, based on the distribution of difficulty modifiers and difficulty management protections across all projections. If the majority of projections or entries on a player scoring above a certain point threshold come with increased difficulty modifiers and additional tactical management selections, the algorithm may raise the performance threshold to maintain contest balance and fairness.

Moreover, the contest parameter data 320 incorporates machine learning models that learn from past contest outcomes, user lineup patterns, and the application of difficulty management selections to predict and automatically adjust contest parameters in a way that enhances user engagement and platform profitability. For instance, a predictive analytics model may use historical data to identify patterns in user behavior when faced with specific contest setups that include difficulty management selections and adjust the difficulty modifiers, or payout structures accordingly to optimize future contest engagement. These advanced algorithms help ensure that the fantasy sports platform dynamically adapts to both market trends and individual user strategies, fostering a competitive yet fair gaming environment.

Payout data 322 may be determined based on increased difficulty modifiers (e.g., "Demons") and decreased difficulty modifiers (e.g., "Goblins"), as well as considerations of player selections associated with difficulty management selections. Payout data 322 includes information regarding the potential financial rewards that users stand to gain based on their contest entries, encompassing not only the selection of players and the application of difficulty modifiers but also any insurance-like protections against nonperformance. This data is dynamically adjusted and recalculated based on a complex interplay between user-selected difficulty modifiers, the entry fees committed by users, performance projections for the athletes involved, and any difficulty management protections applied. Such integrations ensure that the payouts accurately reflect both the tactics used and the protective strategies employed, with "Demons" generally increasing the potential rewards in response to higher difficulty levels while "Goblins" and difficulty management selections moderate the difficulty levels and adjust the rewards accordingly.

The storage of payout data 322 is structured to accommodate the variability introduced by both the difficulty modifiers and the strategic management selections, ensuring that the system can accurately reflect changes in potential payouts in real-time. This involves continuously updating the payout structures to mirror the current landscape, user strategies, latest performance data, and adjustments for nonperformance protections. As users apply these modifiers and protections to their selections, the data store 310 recalculates potential payouts, considering not only the base probabilities of the selected outcomes but also the modified tactical profiles introduced by the user's choices and their protective strategies.

Furthermore, the data store 310's handling of payout data 322 enables the fantasy sports platform to maintain transparency and fairness in contest operations. By systematically adjusting payouts based on well-defined algorithms that account for the impact of both difficulty modifiers and tactical management selections, the platform ensures that users are rewarded in proportion to the difficulty levels they undertake and the strategic protections they employ. This approach not only enhances the gaming experience by adding layers of strategic depth and financial decision-making but also fosters a competitive environment where skill, insight, and proactive tactical management are duly rewarded. The meticulous management and storage of payout data, therefore, are instrumental in aligning the platform's economic model with the dynamic and strategic nature of fantasy sports contests, ensuring that all elements of strategy and protection are reflected in the contest outcomes.

The management service 330, situated within the computing environment 302, is essential for providing a seamless, engaging, and fair fantasy sports experience, now enhanced to include consideration of player selections associated with tactical management selections. This service oversees the reception and processing of user submissions, which now critically includes managing lineup selections that are coupled with tactical management strategies such as insurance-like protections for nonperforming players. It ensures the accurate calculation and distribution of contest outcomes and payouts, taking into account both standard entries and those modified by tactical management decisions. The management service 330 extends its functionality to determine contest parameters that adapt dynamically to the inclusion of tactical management selections, ensuring that all aspects of user strategy and protection are integrated into the gameplay.

Moreover, the management service 330 aggregates and analyzes vast datasets related to contest dynamics, user behavior, and performance metrics, now enriched with data on how tactical management selections influence contest outcomes. This comprehensive analysis facilitates the system's decision-making processes and strategic direction, enabling a more nuanced response to both traditional playing strategies and those that incorporate elements of tactical management. Furthermore, the management service 330 is adaptive and scalable, capable of adjusting to fluctuations in user demand and contest complexity, which is crucial as the incorporation of tactical management strategies can introduce additional layers of complexity to contest administration.

The management service 330 comprises sub-services such as the communication service 332 and the processing service 334, each responsible for specific operational aspects. The communication service ensures efficient data distribution and interaction within the networked environment, crucial for the real-time update and application of tactical management protections. Meanwhile, the processing service 334 handles the analytical and computational tasks necessary for the contest's execution, now also tasked with integrating tactical management data into the overall contest framework. This integration allows the management service to support an expanding array of fantasy sports contests, adapt to changes in sporting schedules, and incorporate new features or functionalities as the platform evolves, ensuring that all elements of player strategy and tactical management are effectively supported. The communication service 332 may manage data exchanges between users' client devices, external resources, and internal computational processes. Moreover, the communication service 332 may ensure the timely and secure transmission of information, facilitating real-time interactions and access to up-to-date contest data, such as user registration details, player selections, and the outcomes of sporting events that influence contest results.

The processing service 334 within the computing environment 302 may execute a broad spectrum of analytical and computational duties associated with the operation and enhancement of the platform, tailoring each aspect of the game to user behavior and strategic tactical decisions. The processing service may comprise one or more specialized sub-services, including the projection service 336, entry fee service 338, modifier service 340, tactical adjustment service 342, contest parameter service 344, and payout service 346, each providing a specific aspect of the fantasy sports contest ecosystem. Cumulatively, these services may perform functions such as outcome prediction, selection assessment, modifier assessment, difficulty adjustment assessment, entry fee determination, payout determination, contest parameter determination, and the generation of insightful analytics. Through its comprehensive data processing capabilities, the processing service 334 enables the platform to offer personalized contest experiences, apply modifiers and difficulty adjustment parameters, and continuously enhance the platform based on user feedback and performance analytics.

The projection service 336 may perform analysis and valuation of projections made by user 102. Utilizing projections data 312, projection service 336 may evaluate the selections made by user 102, which may include a range of attributes such as player performance, game outcomes, and statistical milestones. The projection service 336 may aggregate the user selections and assess the choices across various dimensions, including player form, team dynamics, and historical data, to determine a value for the projections by user 102. This value may reflect the expected performance level. Further, the projection service 336 may provide user 102 with insights into the potential outcomes of their fantasy selections. By assigning a projections value, the projection service 336 may allow user 102 to gauge the strength and potential success of their lineup choices relative to the real-world performances of athletes and teams.

The modifier service 340 may manage application and operational aspects of difficulty modifiers within fantasy sports contests, specifically focusing on increased difficulty modifiers ("Demons") and/or decreased difficulty modifiers ("Goblins"). The modifier service 340 may determine the availability of these modifiers based on a myriad of factors, including a specific context of each contest, detailed player performance statistics, and/or market conditions. By leveraging current and historical data, the modifier service 340 may ensure that the difficulty modifiers are offered in a manner that upholds the competitive balance and integrity of the fantasy sports contests. Moreover, availability of the modifiers may be dynamically adjusted to reflect real-time changes in player conditions, game circumstances, and/or other pertinent factors influencing the tactical assessment of applying a specific modifier.

In addition to managing traditional difficulty modifiers, the modifier service 340 may integrate difficulty adjustment selections into its operational framework. This integration may allow the service to offer users customized options that align with their strategic preferences, enabling users to modify their difficulty level based on real-time insights and predictions. The modifier service 340 may perform an in-depth analysis of how applying a "Demon" or "Goblin" modifier, in conjunction with specific tactical adjustments, alters the expected outcome of a player's performance. For instance, a "Demon" modifier may increase the projected points a player must score to achieve a higher payout, while a "Goblin" modifier may lower this threshold, facilitating an easier win but with a potentially lower payout.

The calculations for these adjustments may be executed through an algorithm that incorporates player performance trends, historical matchup data, and statistical probabilities, ensuring that the application of modifiers and difficulty adjustments is both logical and data driven. This comprehensive approach may provide users with meaningful and strategically impactful choices that significantly influence their potential winnings and contest strategies. Furthermore, the modifier service 340 may synthesize this information to recalibrate potential payouts in accordance with the adjustments provided by the selected modifiers and related changes. This synthesis may ensure that the financial aspects of contest participation (e.g., entry fees and potential winnings) are directly aligned with the strategic decisions made by users, thereby enhancing user engagement by making financial outcomes directly responsive to user choices and deepening the strategic complexity of the fantasy sports experience.

Accordingly, the modifier service 340 may facilitate a more engaging, nuanced, and potentially more rewarding fantasy sports experience, encouraging users to thoughtfully consider the impact of their tactical behaviors in relation to both their strategic approaches and financial outcomes. By integrating tactical adjustment selections with traditional difficulty modifiers, the modifier service 340 may offer a tailored gaming experience that adapts to user preferences and evolving game dynamics, enhancing both the appeal and functionality of the fantasy sports platform.

The management service 330 may include a tactical adjustment service 342 to enhance user experience by further managing difficulty levels associated with player selections and contest dynamics. The tactical adjustment service 342 may offer tailored tactical adjustment options that allow users to mitigate the potential negative impacts of unforeseen events, such as player injuries or underperformance, thereby securing their lineups in a more controlled and predictable manner.

According to some aspects, the tactical adjustment service 342 may analyze a vast array of data inputs, including one or more of player health updates, real-time sports analytics, and/or historical performance trends. By integrating these inputs, the tactical adjustment service 342 may offer dynamic tactical adjustment options that are specifically tailored to the current conditions of the contest and the players involved. By integrating a deep analysis of player performance trends, historical data, and other sports analytics, the tactical adjustment service 342 may offer tactical adjustment options that enable users to adjust their difficulty level based on the latest available data, enhancing their ability to make informed strategic decisions. The tactical adjustment options may allow users to safeguard their potential gains and limit losses from unforeseen player underperformance or non-participation due to injuries or other factors.

For example, a user interested in applying a strategy with a higher difficulty level may choose to increase the yardage a quarterback is expected to throw from 200 to 300 yards, significantly enhancing the difficulty of the achievement but also the potential payout. Simultaneously, the user may choose a similar modifier for a running back, expecting 80 yards to turn into 120. Rather than only carry high levels of difficulty with high rewards (e.g., directly tied to the performance of these players without any form of mitigation if one player fails to perform) the tactical adjustment service 342 may allow the user to opt for a modified lineup (e.g., for an associated fee), recalculating the difficulty level and modifying the payout structure. The resulting modified arrangement may offer partial payouts or adjusted win conditions if, for example, only one of the two players meets the enhanced performance criteria, thus securing a portion of the potential gain despite some level of non-performance.

According to some aspects, the tactical adjustment service 342 may integrate predictive analytics and/or machine learning models that analyze vast amounts of player data and historical performance metrics to assess the likelihood of each player's non-performance. The tactical adjustment service 342 may calculate the probability of each event occurring, such as the quarterback throwing for 300 yards or the running back running for 120 yards, and dynamically offer payout modifications based on these probabilities. These calculations may take into account various factors, including one or more of player fitness, recent performance, opposing team defense statistics, weather conditions, etc., providing a comprehensive assessment that is used to tailor the lineup modification options offered to each user.

According to some aspects, the tactical adjustment service 342 may be implemented through a sophisticated system that continuously updates its databases with real-time data feeds from sports analytics providers, such as player health reports, and even social media for off-the-cuff remarks about player conditions. When a user makes a selection, the tactical adjustment service 342 may immediately evaluate the associated level of difficulty of winning based on the latest available data. If the assessed level of difficulty of winning exceeds a predetermined threshold, the tactical adjustment service 342 may trigger an offer for a modified lineup. The user may then review the terms of this offer, which may detail the new win conditions and potential payouts, and decide whether to accept the modified lineup for an additional fec. Moreover, the tactical adjustment service 342 may utilize financial models that forecast potential outcomes based on modified conditions, ensuring that mitigation options may be offered without incurring unexpected losses.

Furthermore, the tactical adjustment service 342 may enhance user engagement by providing a wider array of strategic choices for lineups. Users may be more likely to engage in creating lineups with a higher difficulty level if they know there are mechanisms to mitigate outright losses, thus driving sustained interaction with the fantasy sports contest. Accordingly, the tactical adjustment service 342 may protect users' lineups and may strategically enhance the contest's appeal by offering a more nuanced experience that caters to both conservative and aggressive strategies.

The Management Service 330 may include a contest parameters service 344. The contest parameters service 344 may determine and adjust various contest parameters for the fantasy sports contests. The contest parameters service 344 may utilize one or more algorithms and data analytics, focusing on integrating user-selected increased difficulty modifiers ("Demons") and decreased difficulty modifiers ("Goblins"), to dynamically modify contest parameters such as difficulty level, payout structures and performance thresholds.

The contest parameters service 344 may recalibrate contest dynamics to incorporate one or more inputs, including player performance projections, user-submitted entry fees, selected difficulty modifiers, and/or effects of strategic adjustment selections made by participants. The contest parameters service 344 may employ advanced algorithms and machine learning models to dynamically adjust contest parameters, ensuring an adaptive and equitable gaming environment that responds in real time to changes in player and game conditions. One or more strategic adjustment selections may be used by the contest parameters service 344 to more accurately reflect the current difficulty level of each contest. For example, when participants apply strategic adjustments (e.g., substitutions for injured players, scoring adjustments for underperforming athletes), the contest parameters service 344 may recalibrate the contest parameters to account for the strategic adjustments. Moreover, if a significant number of participants select strategic adjustments associated with a player's potential injury, the contest parameters service 344 may modify the payout structure or scoring rules to maintain competitive balance and fairness among all contest entries.

Furthermore, the contest parameters service 344 may integrate tactical adjustment selections with other data inputs to fine-tune the contest dynamics. This integration may adjust game parameters based on an aggregate impact of difficulty modifiers and adjustments, thereby ensuring that the anticipated performance levels reflected in player projections are aligned with the actual playing field conditions. The contest parameters service 344 may leverage predictive analytics to anticipate future trends in player performance and contest participation, allowing for preemptive adjustments that enhance participant satisfaction and engagement. In terms of financial implications, the contest parameters service 344 may dynamically adjust entry fees and potential payouts based on the combined effect of difficulty modifiers and strategic adjustment selections. The adjustments may include altered lineup difficulty levels resulting from participants' strategic decisions, such as opting for increased difficulty with "Demons" or decreased difficulty with "Goblins," and integrates the difficulty level profiles with specific tactical adjustments to ensure that financial terms are commensurate with the overall difficulty level undertaken by each participant.

By maintaining a data-driven approach, the contest parameters service 344 may synthesize vast amounts of data (e.g., from player projections and historical performance metrics to real-time lineup trends and difficulty adjustment selections) to create a dynamic and engaging gaming environment. The contest parameters service 344 may adapt contest parameters in response to user behavior and/or in accordance with external factors such as player availability and game-day conditions, ensuring that the platform remains attractive, fair, and responsive to the needs of its users. Through these comprehensive functionalities, the contest parameters service 344 may significantly enhance the strategic depth and enjoyment of the fantasy sports experience, promoting an environment where tactical decisions have a direct and meaningful impact on contest outcomes.

The Management Service 330 may include a payout service 346 to determine appropriate payouts for fantasy sports contests. The payout service 346 may integrate effects of both difficulty modifiers and strategic adjustment selections into its calculations. According to some aspects, the payout service 346 may utilize one or more algorithms to consider the outcomes of user-selected projections alongside the impact of difficulty modifiers, such as increased difficulty modifiers ("Demons") and decreased difficulty modifiers ("Goblins"), and may consider the difficulty adjustment selections made by users. According to some aspects, the difficulty adjustment selections may be utilized by the payout service 346 to fine-tune the payout calculations to reflect the actual difficulty level more accurately. For instance, if a user applies a strategic adjustment covering a player injury or a sudden change in player availability, the payout service 346 may recalculate the potential payouts to account for the strategic adjustments, e.g., mitigating losses associated with the injury or non-performance of the player. The recalculations may consider the immediate impact of the adjustment on player performance and/or how these changes interact with any difficulty modifiers already in place. For example, a "Demon" modifier, combined with a strategic adjustment for an injured player, may alter the payout structure significantly, recognizing both the heightened challenge and the adjusted expectations for performance.

Moreover, the algorithms employed by the payout service 346 may integrate a wide range of data, including historical performance statistics of players, predictive analytics, and real-time performance data. This comprehensive data may allow the service to assess the adjusted probability of achieving the user-specified outcomes, factoring in all modifiers and adjustments. This assessment may ensure that the payouts are proportional to the actual difficulty levels selected by the user, enhancing the fairness of the financial rewards. Furthermore, the payout service 346 may maintain transparency in the payout determination process by providing users with detailed explanations of how both difficulty modifiers and strategic adjustment selections affect their potential winnings. This transparency may foster a sense of fairness and clarity, ensuring that users are well-informed about the mechanics behind their contest entries and the financial implications of their strategic decisions.

By incorporating tactical adjustment selections into the payout calculations, the payout service 346 may ensure that payouts are reflective of the unique configurations of each contest entry and enhance the engagement and strategic depth of the fantasy sports contests. The payout service 346 may encourage users to explore various strategic avenues through the judicious application of difficulty modifiers and adjustments, promoting a balanced and enjoyable gaming experience that aligns with users' strategic preferences and real-world changes in player conditions.

Figure 4:
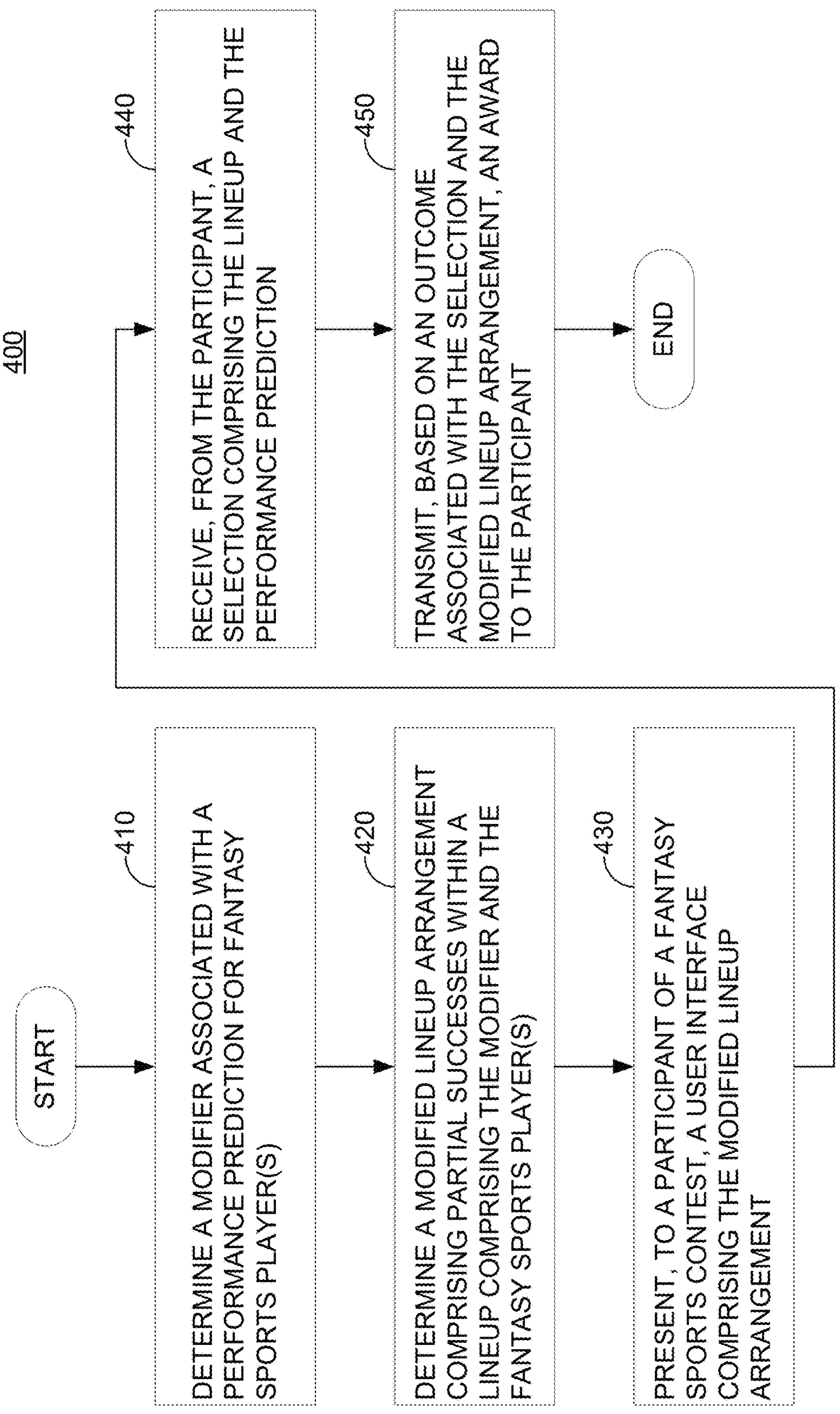
FIG. 4 illustrates an exemplary process for modifying lineup arrangements in fantasy sports contests.

Referring now to FIG. 4, illustrated is a flowchart of a process 400, according to one example of the disclosed systems and processes. The process 400 may demonstrate a technique for managing and adjusting outcomes by modifying the effects of player performance predictions through strategic game modifiers and comprehensive tactical approaches.

At box 410, the process 400 may include determining a modifier associated with a performance prediction for one or more fantasy sports players. The modifier may be selected by a participant of a fantasy sports contest to balance difficulty levels in line with strategic gaming enhancements. Modifiers such as "demon" and "goblin" may be determined, where a demon modifier may increase the potential rewards based on a higher difficulty level, enhancing the payout if the player performs exceptionally well. Conversely, a goblin modifier may reduce potential losses by lowering the difficulty level, suitable for players who may not perform as expected, thus protecting the participant from less favorable outcomes. Moreover, the modifiers may adjust the potential outcomes dynamically, with adjustments based on historical accuracy of the performance predictions for players with similar profiles. According to some aspects, adjustments may be based on real-time data such as injury reports or player substitutions, reflecting the dynamic nature of sports and the necessity to adapt strategies.

The performance prediction may include an estimated statistical output for the one or more fantasy sports players and may be derived from analytical assessments of various factors including historical performance, current season statistics, injury status, and other real-time variables that might affect a player's game-day performance. For example, the performance prediction for a basketball player may include expected points, rebounds, assists, or defensive statistics like blocks or steals. The performance predictions may be selected by fantasy sports participants when selecting players for their virtual teams, e.g., providing a foundation for making informed decisions and strategizing around possible outcomes and rewards linked to individual player performances.

Fantasy sports players may include real-life athletes selected by participants to form their virtual fantasy teams. The performance of the fantasy sports players in actual games may influence the fantasy points they accumulate, which in turn may affect the participant's standing within the fantasy sports contest. Players may be chosen by participants based on their expected contribution to the team's success, guided by performance predictions. In a fantasy soccer game, for instance, participants may choose players such as forwards, midfielders, defenders, and goalkeepers, each contributing differently based on their roles and expected performances in upcoming matches. The selection of these players, influenced by the modifiers applied to their performance predictions, may introduce a strategic element to managing the fantasy team, where each decision may impact the overall success or failure of the participant's lineup.

At box 420, the process 400 may include determining a modified lineup arrangement comprising partial successes within a lineup including the modifier and the one or more fantasy sports players. The modified lineup arrangement may facilitate a more dynamic and engaging gaming experience by acknowledging and rewarding not just complete success but also partial achievements within the lineup. For example, in a modified lineup arrangement, if a participant's lineup for a fantasy basketball league includes five players, the participant may be rewarded not only when all players exceed performance thresholds but also when only some of them do. This modified lineup arrangement may mitigate the disappointment of player underperformance, injuries, or non-participation, making the game fairer and more appealing. The modified lineup arrangement may include a tiered payout structure that provides incremental rewards based on achieving specific performance thresholds by the fantasy sports players. Moreover, the modified lineup arrangement may take into account one or more statistical models that consider external factors such as weather conditions, player matchups, or venue characteristics, enhancing the gaming strategy.

The modified lineup arrangement may include one or more partial successes. The partial successes may include situations where some players in the lineup perform as expected or excel, while others may not due to various reasons such as injuries, underperformance, or external game factors. By integrating partial successes, the modified lineup arrangement acknowledges the realities of sports where not every player may have an optimal game day. For example, in a fantasy football contest, partial successes may be recognized when a quarterback throws for the required yards, but the key receiver fails to catch the necessary number of passes due to an in-game injury. This nuanced approach to success and reward may help maintain user engagement and satisfaction, as participants see value returned more consistently across the contest's duration.

The lineup may comprise a selection of players chosen (e.g., by the fantasy sports system and/or by a participant) based on their expected performances in real-world events. In determining the modified lineup arrangement, each player's potential contribution to the lineup may be considered, accommodating for the variability of sports performances. For instance, a participant may select a lineup for a fantasy baseball game that includes pitchers and batters; the modified lineup arrangement may then provide partial payouts if the pitchers achieve a certain number of strikeouts or the batters hit a predefined number of home runs, even if other players in the lineup do not meet their respective performance targets. This strategy may allow participants to benefit from the standout performances of specific players, thereby maintaining engagement even when other aspects of their lineup underperform. Moreover, this approach not only enhances strategic depth by rewarding insightful player picks but also boosts the overall resilience of the participant's lineup against unpredictable sports outcomes.

At box 430, the process 400 may include presenting, to a participant of a fantasy sports contest, a user interface comprising the modified lineup arrangement. The participant may include an individual who engages with the fantasy sports platform, e.g., actively assembling and managing a virtual team based on real-life sports players. Each participant may make strategic decisions about which players to include in their teams, based on their knowledge of the sport and the players' current form and potential performance. For example, a participant in a fantasy football league might choose players for an upcoming match week, considering factors such as player fitness, recent performances, and opposition strengths. The user interface may dynamically display real-time updates of player performance, which may be sourced from a variety of sports data feeds, thereby ensuring the information is current and relevant. Additionally, historical performance data including past game statistics, injury history, and player availability may be prominently featured to provide a comprehensive overview of each player.

The user interface may serve as the visual and interactive medium through which participants receive information and make decisions. The user interface may be intuitive and user-friendly, providing all necessary data clearly and efficiently to aid participants in their decision-making. The user interface may display various elements such as player statistics, team rosters, game schedules, and the modified lineup arrangement that outlines the structure of potential payouts associated with different player selections. For example, the user interface may show detailed statistics for a basketball player, including average points per game, assists, and rebounds, alongside the impact of selected modifiers on potential game outcomes.

As displayed by the user interface, the modified lineup arrangement may include details about how partial successes within the participant's lineup can influence potential payouts, providing a strategic depth to the gameplay. The modified lineup arrangement may be visualized by the user interface via dynamic elements such as sliders or toggles that allow participants to adjust their lineup choices, such as choosing a "demon" or "goblin" modifier for a player, which may respectively increase or decrease the difficulty level and potential payout based on the player's projected performance. An example could be a soccer fantasy contest where the interface shows the effect of a "demon" modifier on a striker, which increases the difficulty level but also the potential payout, thus allowing the participant to gauge the modifications from this scenario directly through the interface. According to some aspects, the user interface may include graphical elements such as charts, progress bars, or interactive simulations that depict how different scenarios within the participant's lineup might play out. For example, the user interface may visually represent each player in the lineup with icons or avatars, accompanied by indicators showing the status of each player's performance (like green for meeting performance targets and red for underperformance). If a key player in the lineup does not play due to injury, this may be indicated with a specific icon, and the interface may dynamically adjust to show how this affects potential payouts.

Additionally, the interface may include hypothetical scenarios as interactive elements where participants can simulate changes in their lineup and see the potential effects in real time. For instance, if a participant in a baseball fantasy league has chosen a pitcher known for strikeouts and a hitter renowned for home runs, but the pitcher is unexpectedly benched before the game, the interface may simulate and display the adjusted potential earnings based on the hitter's performance alone or with a replacement pitcher. This visual and interactive representation may help participants understand the nuances of their choices and the inherent consequences of their sports management decisions, making the gaming experience both engaging and educational.

At box 440, the process 400 may include receiving, from the participant, a selection comprising the lineup and the performance prediction. The selection may include one or more of the participant's active choices, which may include one or more of the lineups of players and their associated performance predictions for an upcoming sports contest. The selected lineup may include a set of players chosen by the participant from available athlete pools, reflecting various positions or roles depending on the sport (e.g., pitchers and batters in baseball, quarterbacks and receivers in football). The performance predictions may include the participant's forecasts for how these players will perform in terms of statistical outputs, such as touchdowns, yards gained, home runs, or strikeouts.

For example, a participant in a fantasy baseball league may select a lineup featuring a starting pitcher known for strikeouts and a power hitter expected to hit home runs. Alongside choosing these players, the participant may also submit their performance predictions, perhaps predicting the pitcher will achieve a certain number of strikeouts and the hitter will secure multiple RBIs in their respective games. This selection process may be facilitated by the user interface, which may allow the participant to easily navigate between different player stats, recent performance data, and expert analyses to make informed decisions. Once the selection is made and submitted through the user interface, associated information may be captured and recorded in a database. Moreover, the associated information may be utilized to adjust the gaming dynamics based on the chosen modifiers and the predicted outcomes. The accuracy of the participant's predictions, combined with the real-life performances of the selected players, may be used to determine the success of the selected lineup and influence the calculation of any rewards or payouts. Receiving and processing these selections may ensure that each participant's strategic decisions are seamlessly integrated into the overall contest dynamics, enhancing the interactive and competitive nature of the fantasy sports experience.

At box 450, the process 400 may include transmitting, based on an outcome associated with the selection and the modified lineup arrangement, an award to the participant. The outcome may include the actual performances of the players selected by the participant, as compared to the performance predictions submitted. The outcome may be measured against the set benchmarks within the context of the game, such as player statistics in real matches, which may include points scored, yards run, or home runs hit, depending on the sport.

In a scenario where a modified lineup arrangement includes only partial successes, the outcome may include the performance of some players meeting the pre-set criteria or thresholds within the fantasy sports contest, while others in the same lineup do not. For example, in a fantasy football contest, this could occur if a quarterback exceeds passing yard expectations, but a key wide receiver fails to catch the minimum projected passes due to an in-game injury. The partial success may be acknowledged when some but not all of the lineup's components achieve their predicted performance markers, reflecting a nuanced approach to difficulty level and tactical choices in the fantasy sports setting.

The award may include rewards or payouts distributed to the participant based on the accuracy of their predictions and the effectiveness of their strategic choices in the lineup. The award may vary and may be shaped by the degree of success each player achieves relative to the predictions and the specific conditions of the modified lineup arrangement. For example, if a participant's chosen baseball player hits more home runs than predicted and this performance falls under a higher difficulty modifier, the payout may be increased.

Moreover, the award may be determined based on the extent of the partial successes within the participant's lineup. The award may be based on the individual performances that met the criteria and may proportionally allocate rewards based on these successes. For example, if a participant's lineup under a partial success arrangement promised a higher payout for a quarterback exceeding 300 yards (e.g., which occurred) but a lower deduction for a receiver failing to meet the reception threshold, the final award may be adjusted accordingly. This example scenario may result in a reduced payout that still provides some return on the participant's strategic decisions, thereby maintaining engagement despite the mixed outcomes. Encouragement for strategic tactical choices to increase the difficulty level may be balanced with a safeguard against the worst consequences of such a difficulty level, fostering a dynamic and engaging participant experience in the fantasy sports platform.

Transmission of the award may include one or more steps. The performance of each player in the participant's lineup may be evaluated against the predictions and a resultant award may be calculated based on the predetermined rules of the modified lineup arrangement. For example, the award may include additional bonuses for exact or nearly accurate predictions and partial payouts for achieving baseline performance thresholds. Once calculated, the award may be issued to the participant's account on the fantasy sports platform, e.g., in the form of points, credits, or direct monetary value.

Figure 5:
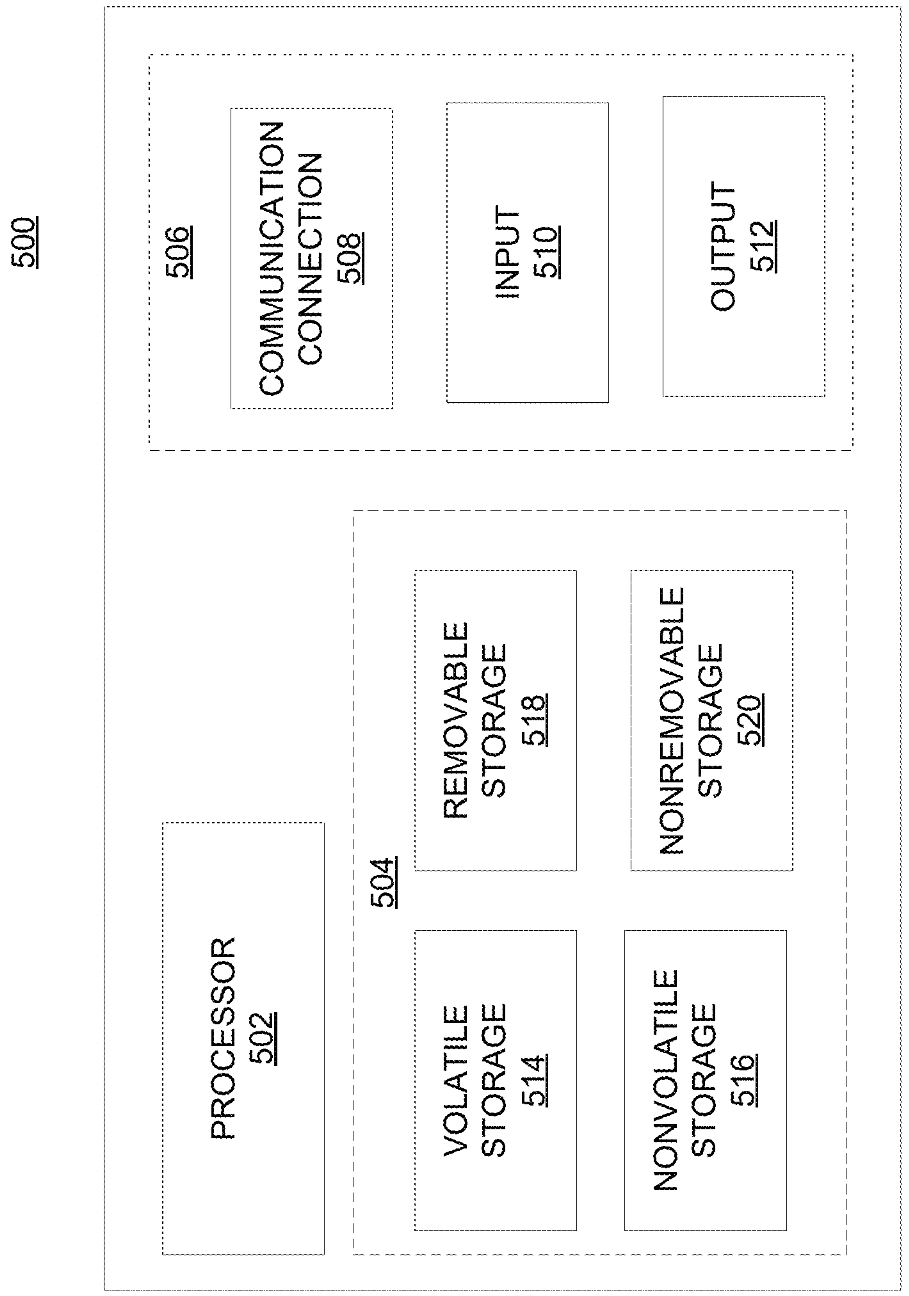
FIG. 5 illustrates a schematic of an exemplary device.

FIG. 5 is a block diagram of a computing device 500 that may be connected to or comprise a component of environment 200. Computing device 500 may comprise hardware or a combination of hardware and software. The functionality to facilitate fantasy sports contests may reside in one or a combination of computing devices 500. Computing device 500 depicted in FIG. 5 may represent or perform functionality of an appropriate computing device 500, or a combination of computing devices 500, such as, for example, a component or various components of a fantasy sports contest system, a computing device, a processor, a server, a gateway, a database, a firewall, a router, a switch, a modem, an encryption tool, a virtual private network (VPN), a network access control (NAC) device, a secure web gateway, or the like, or any appropriate combination thereof. It is emphasized that the block diagram depicted in FIG. 5 is exemplary and not intended to imply a limitation to a specific example or configuration. Thus, computing device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Computing device 500 may comprise a processor 502 and a memory 504 coupled to processor 502. Memory 504 may contain executable instructions that, when executed by processor 502, cause processor 502 to effectuate operations associated with a fantasy sports contest. As evident from the description herein, computing device 500 is not to be construed as software per se.

In addition to processor 502 and memory 504, computing device 500 may include an input/output system 506. Processor 502, memory 504, and input/output system 506 may be coupled together (coupling not shown in FIG. 5) to allow communications between them. Each portion of computing device 500 may comprise circuitry for performing functions associated with each respective portion. Thus, each portion may comprise hardware, or a combination of hardware and software. Accordingly, each portion of computing device 500 is not to be construed as software per se. Input/output system 506 may be capable of receiving or providing information from or to a communications device or other network entities configured for fantasy sports contests. For example, input/output system 506 may include a wireless communication (e.g., 3G/4G/5G/GPS) card. Input/output system 506 may be capable of receiving or sending video information, audio information, control information, image information, data, or any combination thereof. Input/output system 506 may be capable of transferring information with computing device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of computing device 500 also may contain a communication connection 508 that allows computing device 500 to communicate with other devices, network entities, or the like. Communication connection 508 may comprise communication media. Communication media may embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with fantasy sports contests, such as functions for managing and adjusting outcomes, as described herein. For example, processor 502 may be capable of, in conjunction with any other portion of computing device 500, modifying the effects of player performance predictions through strategic game modifiers and comprehensive tactical strategies, as described herein.

Memory 504 of computing device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with fantasy sports contests. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 500. Memory 504 may comprise executable instructions that, when executed by processor 502, cause processor 502 to effectuate operations associated with fantasy sports contests.

Figure 6:
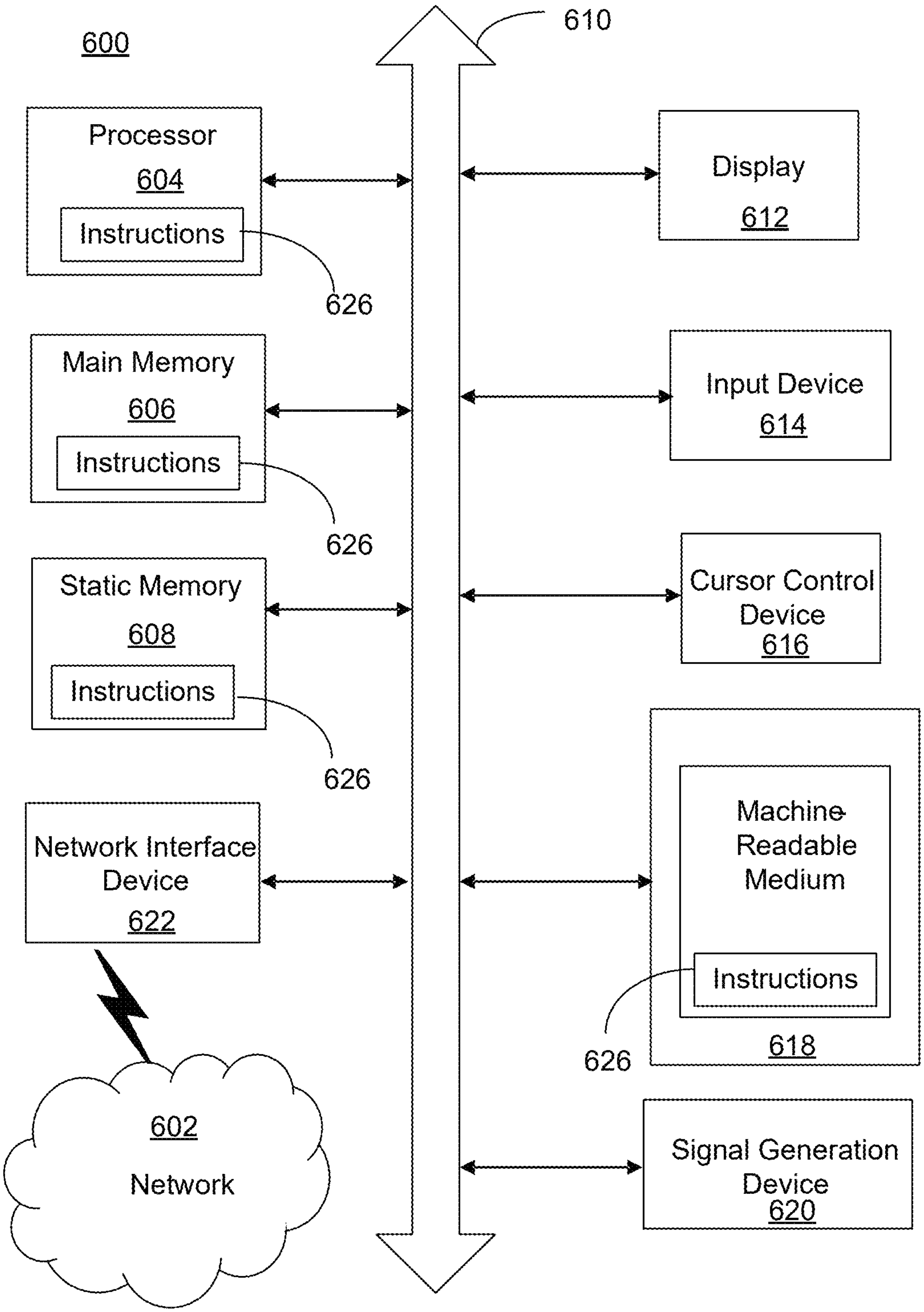
FIG. 6 illustrates an exemplary diagrammatic representation of a machine in the form of a computer system.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 502, server 204, database 206, client device 350, and other devices of FIGS. 1-5. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for fantasy sports contests have been described in connection with various computing devices/processors, the underlying concepts may be applied to any computing device, processor, or system capable of facilitating a fantasy sports contest. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for fantasy sports contests. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with fantasy sports contests as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing fantasy sports contests as described herein. When implemented on a general-purpose processor, the program code combines with the processor to provide a unique device that operates to invoke the functionality of a fantasy sports contest.

While the disclosed systems have been described in connection with the various examples of the various figures, it is to be understood that other similar implementations may be used, or modifications and additions may be made to the described examples of a fantasy sports contest system without deviating therefrom. For example, one skilled in the art will recognize that a fantasy sports contest system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—managing and adjusting outcomes by modifying the effects of player performance predictions through strategic game modifiers and comprehensive tactical strategies—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. One or more computing devices, comprising one or more processors, configured to:

determine a modifier associated with a performance prediction for one or more fantasy sports players, wherein the performance prediction comprises an expected performance metric associated with the one or more fantasy sports players and the modifier is determined based on a set of dynamically adjustable parameters associated with a difficulty level and a reward structure;

dynamically adjust, based on the difficulty level, a likelihood of an actual performance of the one or more sports players from the expected performance metric;

determine a modified lineup arrangement comprising partial successes within a lineup comprising the modifier and the one or more fantasy sports players based on the set of dynamically adjustable parameters, wherein the modified lineup arrangement comprises a tiered reward structure based on an extent of achievement of the performance prediction;

present, to a participant of a fantasy sports contest, a user interface comprising the modified lineup arrangement;

receive, from the participant via the user interface, a selection comprising the modified lineup and the performance prediction; and transmit, based on an outcome associated with the selection and the modified lineup arrangement, an award to the participant.

2. The one or more computing devices of claim 1, wherein the modifier comprises reward parameters that dynamically adjust potential outcomes and transmitting the award to the participant is further based on the adjusted potential outcomes.

3. The one or more computing devices of claim 2, wherein the difficulty level and payout parameters are based on a historical accuracy of the performance prediction for one or more similar player profiles to the one or more fantasy sports players.

4. The one or more computing devices of claim 1, wherein the modified lineup arrangement comprises a tiered payout structure based on an extent of achievement associated with the performance prediction.

5. The one or more computing devices of claim 4, wherein the tiered payout structure comprises incremental rewards based on achieving thresholds associated with performance of the one or more fantasy sports players.

6. The one or more computing devices of claim 1, wherein the modifier comprises at least one of a demon modifier or a goblin modifier.

7. The one or more computing devices of claim 6, wherein the demon modifier increases potential rewards at a higher difficulty level and the goblin modifier reduces potential losses at a lower difficulty level.

8. The one or more computing devices of claim 1, wherein the adjustment is further based on real-time injury reports or player substitutions.

9. The one or more computing devices of claim 1, further configured to receive real-time updates of player performance data, wherein the modified lineup arrangement is determined based on the real-time updates.

10. The one or more computing devices of claim 9, wherein the real-time updates are received from a plurality of sports data feeds.

11. The one or more computing devices of claim 1, wherein the user interface further displays historical performance data of the one or more fantasy sports players.

12. The one or more computing devices of claim 11, wherein the historical performance data comprises at least one of past game statistics, injury history, or player availability.

13. The one or more computing devices of claim 1, wherein the modified lineup arrangement is determined based on statistical models comprising external factors influencing player performance including at least one of a weather condition, a player matchup, or a venue characteristic.

14. The one or more computing devices of claim 1, wherein the performance prediction comprises one or more of points scored, assists made, offensive contributions, or defensive contributions.

15. A method performed by one or more computing devices, the method comprising:

determining a modifier associated with a performance prediction for one or more fantasy sports players, wherein the performance prediction comprises an expected performance metric associated with the one or more fantasy sports players and the modifier is determined based on a set of dynamically adjustable parameters associated with a difficulty level and a reward structure;

dynamically adjusting, based on the difficulty level, a likelihood of an actual performance of the one or more sports players from the expected performance metric;

determining a modified lineup arrangement comprising partial successes within a lineup comprising the modifier and the one or more fantasy sports players based on the set of dynamically adjustable parameters, wherein the modified lineup arrangement comprises a tiered reward structure based on an extent of achievement of the performance prediction;

presenting, to a participant of a fantasy sports contest, a user interface comprising the modified lineup arrangement;

receiving, from the participant via the user interface, a selection comprising the lineup and the performance prediction; and transmitting, based on an outcome associated with the selection and the modified lineup arrangement, an award to the participant.

16. The method of claim 15, wherein the modifier comprises reward parameters that dynamically adjust potential outcomes and transmitting the award to the participant is further based on the adjusted potential outcomes.

17. The method of claim 15, wherein the modified lineup arrangement comprises a tiered payout structure based on an extent of achievement associated with the performance prediction.

18. A system comprising:

one or more processors; and memory coupled with the one or more processors, the memory storing executable instructions that when executed by the one or more processors cause the one or more processors to effectuate operations comprising:

determining a modifier associated with a performance prediction for one or more fantasy sports players, wherein the performance prediction comprises an expected performance metric associated with the one or more fantasy sports players and the modifier is determined based on a set of dynamically adjustable parameters associated with a difficulty level and a reward structure;

dynamically adjusting, based on the difficulty level, a likelihood of an actual performance of the one or more sports players from the expected performance metric;

determining a modified lineup arrangement comprising partial successes within a lineup comprising the modifier and the one or more fantasy sports players based on the set of dynamically adjustable parameters, wherein the modified lineup arrangement comprises a tiered reward structure based on an extent of achievement of the performance prediction;

presenting, to a participant of a fantasy sports contest, a user interface comprising the modified lineup arrangement;

receiving, from the participant via the user interface, a selection comprising the lineup and the performance prediction; and transmitting, based on an outcome associated with the selection and the modified lineup arrangement, an award to the participant.

* * * * *